(12) United States Patent
Belmont et al.

(10) Patent No.: US 8,520,527 B2
(45) Date of Patent: Aug. 27, 2013

(54) IDENTIFYING CLONED DEVICES

(75) Inventors: Brian V. Belmont, West Linn, OR (US); Harindranath P. Nair, Hillsboro, OR (US); Deepak Garageswari, Hillsboro, OR (US); Punit Agarwalla, Hillsboro, OR (US)

(73) Assignee: Arris Enterprises, Inc., Suwanee, GA (US)

( * ) Notice: Subject to any disclaimer, the term of this patent is extended or adjusted under 35 U.S.C. 154(b) by 225 days.

(21) Appl. No.: 13/032,783

(22) Filed: Feb. 23, 2011

(65) Prior Publication Data

US 2012/0213084 A1    Aug. 23, 2012

(51) Int. Cl.
*H04H 60/29*    (2008.01)
*H04L 29/06*    (2006.01)
*H04L 1/00*    (2006.01)
*H04L 12/26*    (2006.01)
*H04W 72/00*    (2009.01)

(52) U.S. Cl.
USPC ............. 370/241; 725/25; 725/111; 713/153; 713/168; 455/435.1

(58) Field of Classification Search
USPC ................ 725/25, 111; 370/241; 455/435.1; 713/153, 168
See application file for complete search history.

(56) References Cited

U.S. PATENT DOCUMENTS

| | | | |
|---|---|---|---|
| 2009/0070800 A1* | 3/2009 | Gould et al. | 725/25 |
| 2009/0175174 A1* | 7/2009 | Semon et al. | 370/241 |

* cited by examiner

*Primary Examiner* — Hoon J Chung
*Assistant Examiner* — Yaotang Wang
(74) *Attorney, Agent, or Firm* — Troy A. Van Aacken (57) ABSTRACT

Methods and apparatuses for locating cloned CPEs in a communication system are provided. A clone detector receives from each access router in a communication system the MAC addresses of CPEs registered with the access router. The clone detector compares the MAC addresses to identify a cloned MAC address. The clone detector determines the service address for the cloned MAC address and identifies neighboring CPEs to the service address. The clone detector determines the access router to which the neighboring CPEs are registered and identifies a CPE having the cloned MAC address and registered to any other access router than the access router to which the neighboring CPEs are registered as a cloned CPE.

7 Claims, 6 Drawing Sheets

IDENTIFYING CLONED DEVICES

TECHNICAL FIELD

This disclosure is related to identifying cloned devices.

BACKGROUND

A Data-Over-Cable Service Interface Specification (DOCSIS) system, for example, can be used to deliver high-definition digital entertainment and telecommunications such as video, voice, and high-speed Internet to subscribers over an existing cable television network. The cable television network can take the form of an all-coax, all-fiber, or hybrid fiber/coax (HFC) network. A multiple service operator (MSO) can deliver these services to subscribers by using a cable modem termination system (CMTS) located at a headend and customer premise equipment (CPE) devices located at subscriber premises. The CPE devices can include, for example, cable modems (CMs) or embedded multimedia terminal adapters (eMTAs), set top boxes, gateway devices, among others.

Typically, to receive services over a cable network, a legitimate subscriber enters into a contract with a MSO in which the subscriber agrees to pay the MSO for a particular level of service based for example on bandwidth. The service can be delivered to the subscriber using an authorized CM, which is identified by a unique MAC address that is assigned to the CM during the manufacturing process.

Unfortunately, the MAC address of the authorized CM can be illegitimately obtained and copied to another CM (i.e., "cloned CM") that is not authorized to access the MSO network. This process is typically described as modem cloning or MAC address cloning. The cloned CM can appear to the MSO network to be the original, authorized CM having the same MAC address. Consequently, the cloned CM can gain access to the MSO network and received services without the user of the cloned CM paying for the service.

This disclosure generally describes systems and methods for identifying cloned CMs and more generally cloned CPE devices and preventing the cloned CPE devices from receiving service over the MSO network. Although this disclosure makes reference to a DOCSIS-based system, this disclosure is not intended to be limited to a DOCSIS-based system.

DETAILED DESCRIPTION

Various implementations of this disclosure locate cloned CMs in a DOCSIS-based system. The various implementations described herein are described with reference to a cable modem, but it should be understood that the concepts disclosed herein can be applied to detecting cloning of any CPE device. A clone detector can receive from each CMTS in a DOCSIS-based system the MAC addresses of CMs registered with the CMTS. The clone detector can compare the MAC addresses to identify a cloned MAC address. The clone detector can determine the service address for the cloned MAC address and identify neighboring CMs to the service address. The clone detector can identify the CMTS to which the neighboring CMs are registered and detect a CM having the cloned MAC address and registered to any other CMTS than the CMTS to which the neighboring CMs are registered as a cloned CM.

Figure 1:
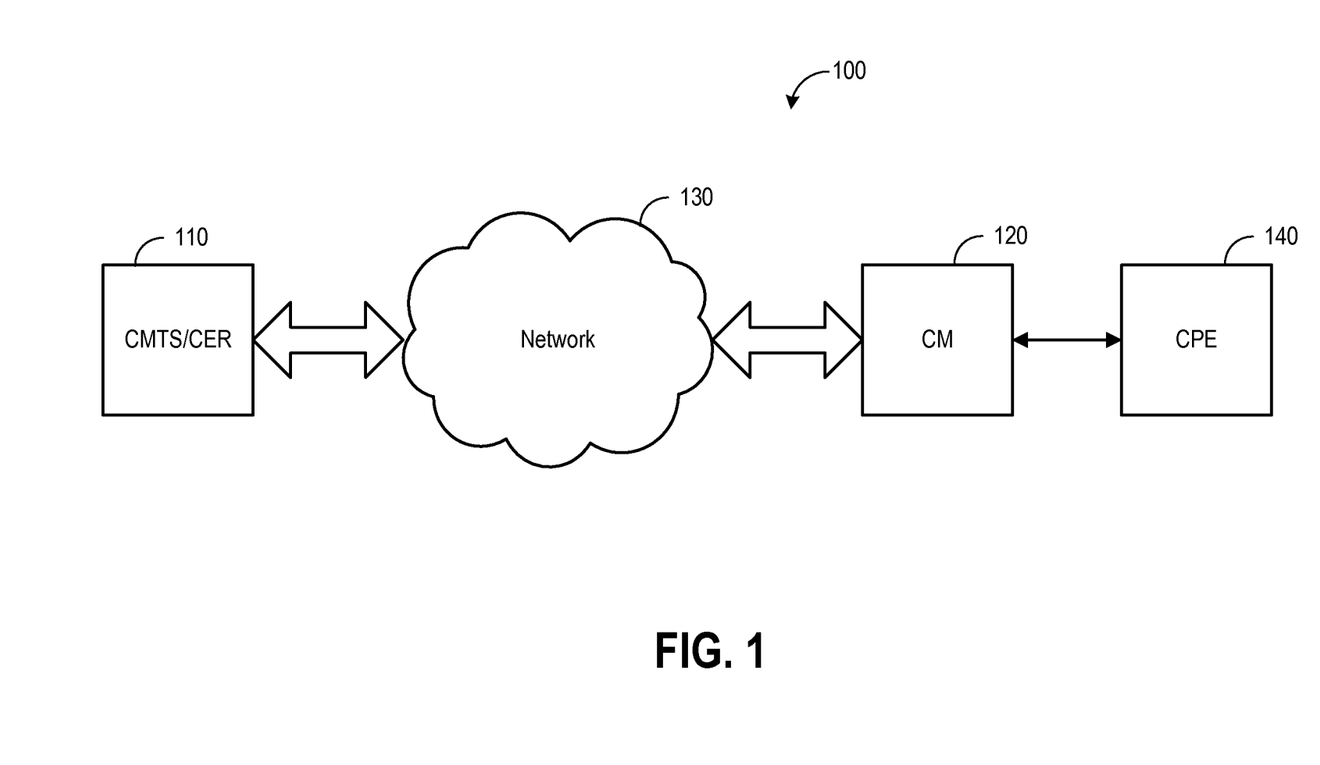
FIG. 1 is a block diagram illustrating an example DOCSIS-based system used to provide communications between a CMTS and a CM over a network.

FIG. 1 illustrates an example DOCSIS-based system operable to deliver high-definition digital entertainment and telecommunications such as video, voice, and high-speed Internet to a subscriber over an existing cable television network. As shown in FIG. 1, traffic (e.g., data, video, and voice signal) can be transferred over a cable network 130 between a CMTS 110 or Converged Edge Router (CER) and an authorized cable modem (CM) 120. The cable network 130 can take the form of an all-coax, all-fiber, or hybrid fiber/coax (HFC) network. Traffic transferred from the CMTS/CER 110 to the authorized CM 120 can be said to travel in a downstream direction on a downstream channel; conversely, traffic transferred from the CM 120 to the CMTS/CER 110 can be said to travel in an upstream direction on an upstream channel. Once the authorized CM 120 receives traffic from the CMTS 110 via the network 130, the CM 120 can deliver the traffic to another CPE device 140 such as a home gateway, a personal computer, or IP telephone.

To become an authorized CM 120 configured to receive traffic over the MSO's cable network 130, the CM 120 can be provisioned for service over the MSO's cable network 130. The DOCSIS specifications (e.g., DOCSIS 1.0, 1.1, 2.0 and 3.0), which are hereby incorporated by reference in their entirety, provide an example process for provisioning a CM 120.

Figure 2:
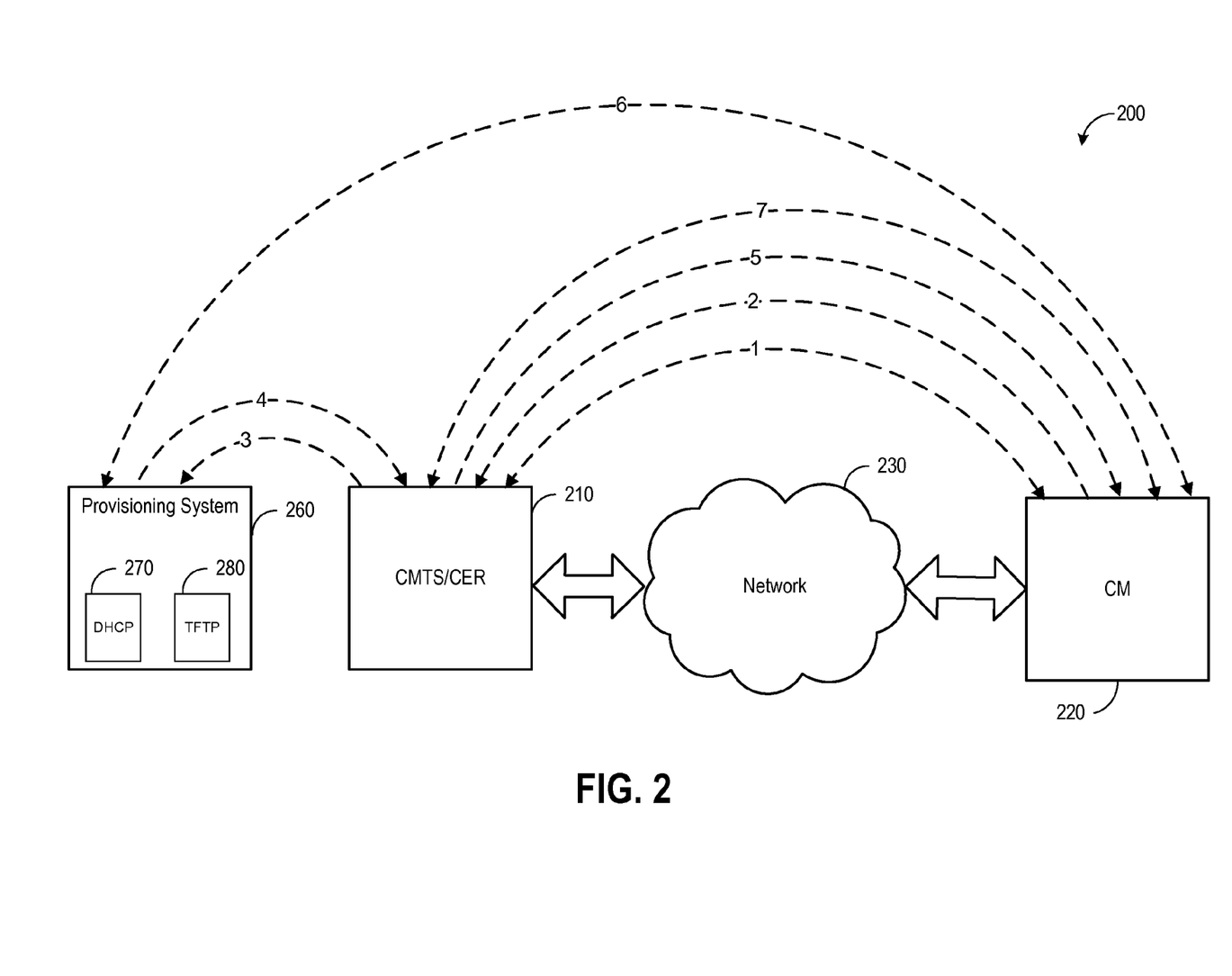
FIG. 2 is a block diagram illustrating an example signaling process operable to provision a CM for service over a network.

FIG. 2 illustrates an example provisioning process 200 that can be used to provision a CM 220 for service over a MSO's cable network 230. After the CM 220 is connected to the cable network 230 and powered-on, the CM 220 can establish two way communications with the CMTS 210 via a downstream/upstream channel pair, at stage 1.

At stage 2, the CM 220 can send a broadcast request through the CMTS/CER 210 to a DHCP server for an IP address and configuration information. The request can include the CM's 220 MAC address.

The CMTS/CER 210 can send the request for an IP address and configuration information to a provisioning system 260 at stage 3. For example, the CMTS/CER 210 can send the request to a DHCP server 270 of the provisioning system 260.

At stage 4, if the DHCP server has a configuration for the CM's 220 MAC address that can be included in the request for an IP address, the DHCP server returns to the CMTS/CER 210 an IP address for the CM 220, the IP address of a TFTP server (e.g., TFTP server 280) that stores the configuration file to be downloaded by the CM 220, and the configuration filename. If the DHCP server does not have a configuration for the CM's 220 MAC address, in some implementations, the DHCP server can return an IP address and configuration that directs the CM 220 to a website to register for service before proceeding to stage 1.

The CMTS/CER 210 forwards the IP address and configuration information to the CM 220 at stage 5.

At stage 6, the CM 220 connects to the TFTP server 280 via the CMTS/CER 210 using the address provided by the DHCP server 270. Once connected, the CM 220 can download the configuration file containing operational related parameters.

After the configuration file is downloaded, the CM 220 registers with the CMTS/CER 210 at stage 7 as described in the DOCSIS specifications, for example.

After the provisioning process is complete, the CM 220 is recognized as an authorized network element and can transmit and receive traffic pursuant to the level of service for which the user of the CM 220 subscribed.

As mentioned above, the MAC address of the authorized CM 220 can be obtained and copied to another CM (i.e., "cloned CM"). Then the cloned CM, without properly registering with the MSO, can gain access to the MSO network and receive the same level of service for which the user of the authorized CM 120 is subscribed.

Figure 3:
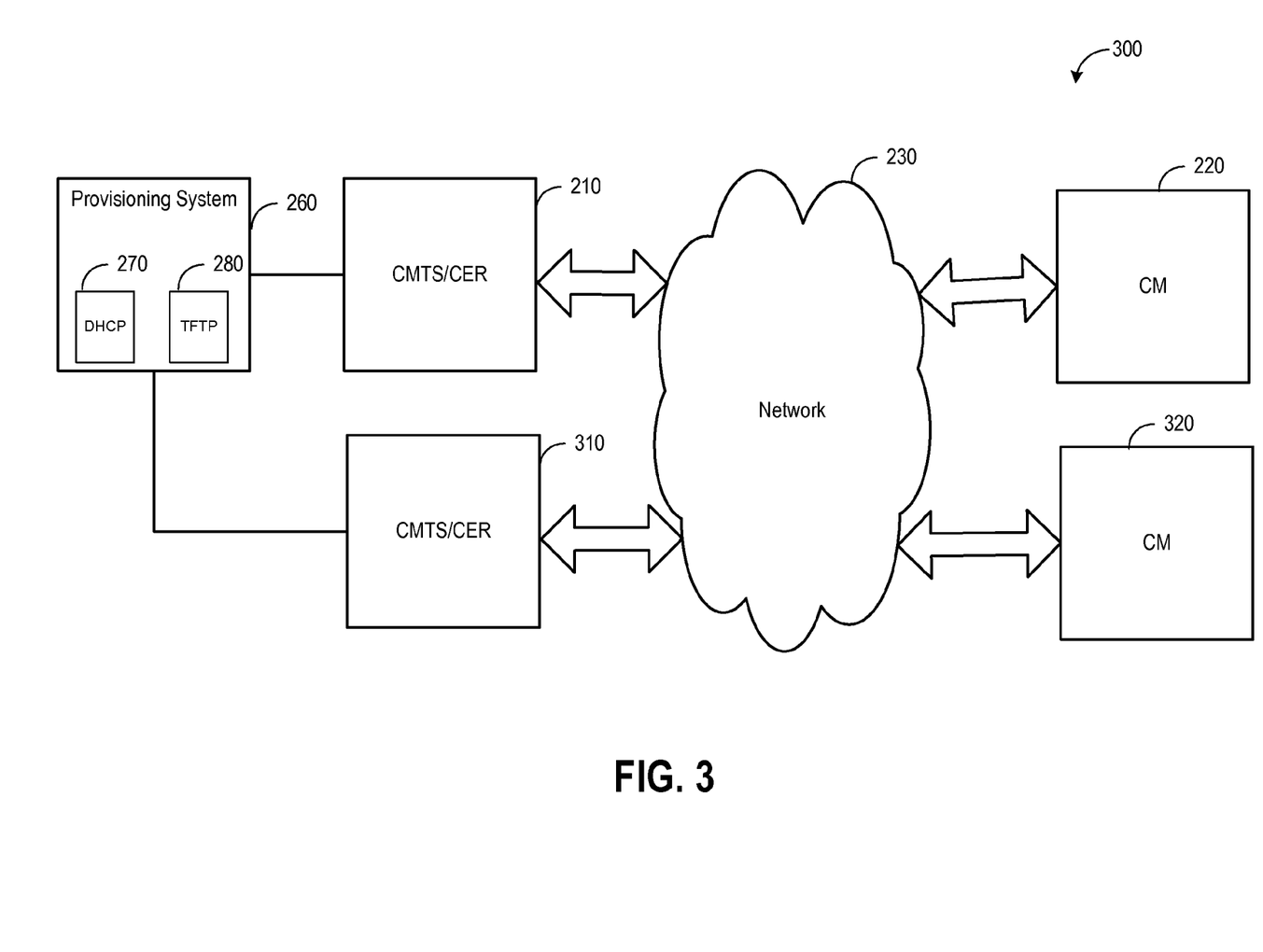
FIG. 3 is a block diagram illustrating an example DOCSIS-based system having an authorized CM and cloned CM.

FIG. 3 illustrates an example DOCSIS-based system 300 having an authorized CM 220 and cloned CM 320 to illustrate how a cloned CM 320 can be provisioned for service over a MSO's cable network 230 without subscribing for the service.

The DOCSIS-based system 300 includes an authorized CM 220 that has been provisioned according to a provisioning process (e.g., provisioning process 200 described with respect to FIG. 2). In the example DOCSIS-based system 300 of FIG. 3, the authorized CM 220 is registered with CMTS/CER 210.

A cloned CM 320 can be programmed to have the same MAC address as the authorized CM 120. This cloned CM 320 can gain access to the MSO's cable network 230 using the same provisioning process 200 described with respect to FIG. 2. However, the user of the cloned CM 320 often registers with a different CMTS/CER than the CMTS/CER for which the authorized CM 320 is registered. In the example DOCSIS-based system 300 of FIG. 3, the cloned CM 320 is registered with CMTS/CER 310.

The cloned CM 320 can become provisioned for service over the MSO's cable network 230 including registering with CMTS/CER 310 by first establishing two way communications with the CMTS/CER 310 via a downstream/upstream channel pair. The cloned CM 320 then sends a broadcast request through the CMTS/CER 310 to a DHCP server for an IP address and configuration information. The request includes the cloned CM's 320 MAC address, which is the same MAC address as the authorized CM 120. The CMTS/CER 310 can send the cloned CM's 320 request to a provisioning system (e.g., the provisioning system 260). Because the authorized CM 220 has already registered for service, a matching MAC address will exist in the DHCP server (e.g., the DHCP server 270 of provisioning system 260). A DHCP server of the provisioning system (e.g., DHCP server 270) then can send an IP address for the cloned CM 320 to the CMTS/CER 310. The DHCP server can also send to the CMTS/CER 310 the IP address of a TFTP server (e.g., TFTP service 280) that stores a configuration file to be downloaded by the cloned CM 320 and the configuration filename. The CMTS/CER 310 can then forward the IP address and configuration information to the cloned CM 320 and the cloned CM 320 connects to the TFTP server via the CMTS/CER 310 using the address provided by the DHCP server and downloads the configuration file containing operational related parameters.

After the configuration file is downloaded, the cloned CM 320 registers with the CMTS/CER 310 as described by DOCSIS specifications, for example. After the provisioning process is complete, the cloned CM 320 can transmit and receive traffic at the level of service associated with the authorized CM's 120 subscribed level of service. After the cloned CM 320 becomes provisioned for service, the DOCSIS-based system 300 has no mechanism in place to determine which of the CMs 220, 320 is the cloned CM.

Figure 4:
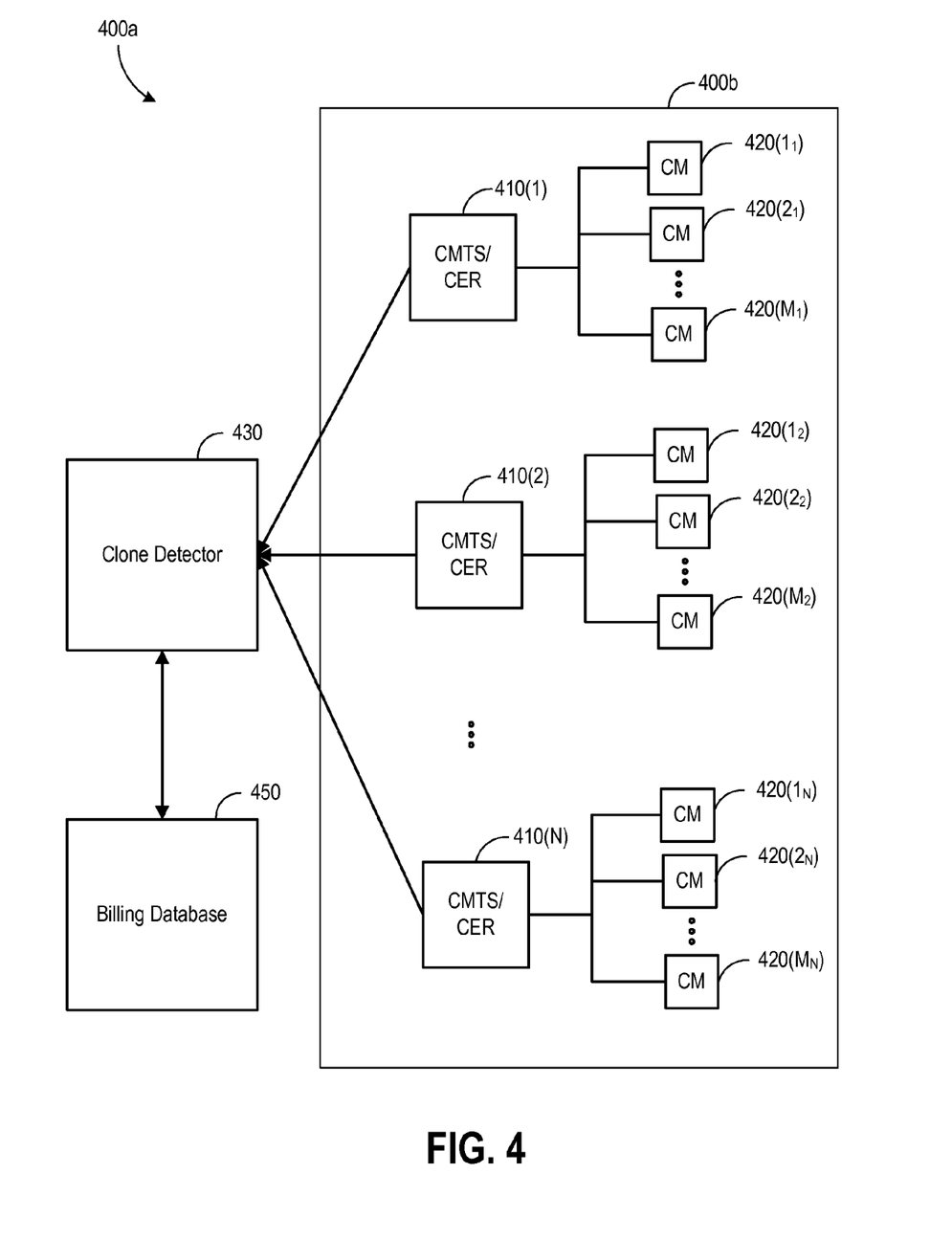
FIG. 4 is a block diagram illustrating an example system that can be used to identify a clone CM in a DOCSIS-based system.

FIG. 4 illustrates an example system 400*a* that can be used to identify the cloned CMs in a DOCSIS-based system 400*b*. As shown in FIG. 4, a DOCSIS-based system 400*b* can consist of multiple CMTSs/CERs 410(1), 410(2), . . . , 410(N). Each CMTS/CER 410(i), i=1, . . . , N can have a set of CMs 420($j_i$), j=1, . . . , $M_i$ that are registered with the CMTS/CER 410(i). Among all the CMs in the DOCSIS-based system 400*b*, there can exist one or more cloned CMs having the same MAC address as one or more authorized CMs. For example, assume that the CM 420($2_N$), which is registered with CMTS/CER 410(N), is a cloned CM and has the same MAC address as an authorized CM, CM 420($1_1$), which is registered with CMTS/CER 410(1).

As discussed above, the DOCSIS-based system 400*b* has no mechanism in place to determine which CMs are cloned CMs. Thus, to identify which CMs in the system are cloned CMs, a clone detector 430 can be used to locate the cloned CMs in the DOCSIS-based system 400*b*. The clone detector 430 can perform an example process (e.g., example process 500 of FIG. 5) to locate one or more cloned CMs in the DOCSIS-based system 400*b*. For the example DOCSIS-based system 400*b* of FIG. 4, the clone detector 430 can perform the example process 500 of FIG. 5 to determine which of CM 420($1_1$) and CM 420($2_N$) is the cloned CM.

Figure 5:
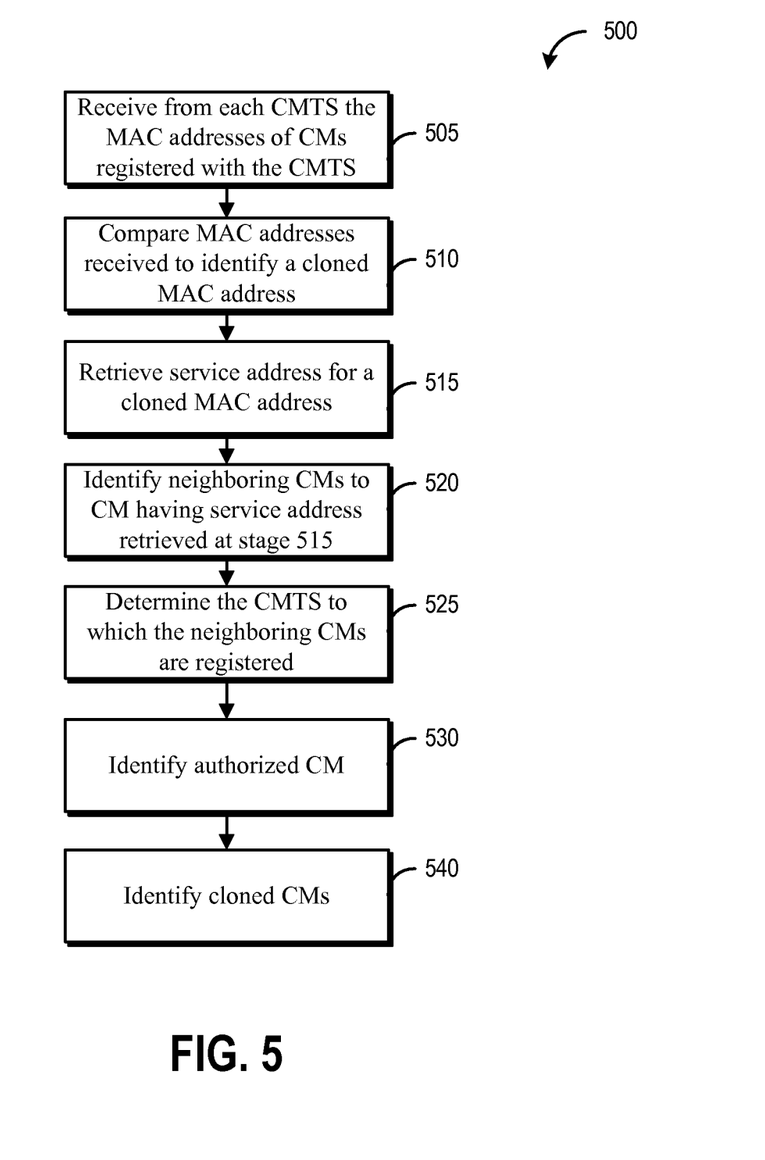
FIG. 5 is a flowchart illustrating an example process to locate a cloned CM in a DOCSIS-based system.

At stage 505, a clone detector (e.g., clone detector 430) receives from each of the CMTSs/CERs (e.g., CMTSs/CERs 410(i), i=1, . . . , N) the MAC addresses of all the CMs registered with the CMTS/CER.

At stage 510, the clone detector then compares the MAC addresses received from the CMTSs to identify which MAC addresses are registered to more than one CMTS. The MAC addresses that are registered to more than one CMTS can be identified as cloned MAC addresses. In the example DOCSIS-based system 400*b* of FIG. 4, the clone detector 430 can receive the same MAC address from CMTS 402(1) and CMTS 402(N) for CM 420($1_1$) and CM 420($2_N$), respectively. The clone detector 430 will identify this MAC address, (hereinafter referred to as "MAC address at issue" or "duplicated MAC address"), as a cloned MAC address. For each of the cloned MAC addresses identified at stage 510, the clone detector (e.g., clone detector 430) performs stages 515 through 550.

At stage 515, the clone detector (e.g., clone detector 430) retrieves the service address for the cloned MAC address from a database such as a billing database 450. The service address is the location of the authorized CM having the MAC address at issue. For the example DOCSIS-based system 400*b* of FIG. 4, the clone detector 430 will retrieve the service address for the MAC address associated with CM 420($1_1$) and CM 420($2_N$). The service address retrieved for the MAC address at issue will be considered the location of the authorized CM having the MAC address at issue.

At stage 520, the clone detector (e.g., clone detector 430) uses the service address retrieved at stage 515 to identify other CMs each having a service address in a similar physical vicinity to the service address retrieved at stage 515. That is, at stage 520, the clone detector 430 identifies other CMs (i.e., neighboring CMs) that are in a similar physical vicinity of the authorized CM (although the CM that is the authorized CM has yet to be identified). For the example DOCSIS-based system 400*b* of FIG. 4, the clone detector 430 can identify CMs 420($j_1$), j=1, . . . , $M_i$ as being in a similar physical vicinity to the service address for the authorized CM based upon their respective service addresses.

At stage 525, the clone detector (e.g., clone detector 430) determines the CMTS to which the CMs in the similar physical vicinity identified at stage 520 are registered. In one implementation, the clone detector (e.g., clone detector 430) can determine the CMTS to which the neighboring CMs are registered by first retrieving from a database, such as the billing database 450, the MAC address for each neighboring CM identified at stage 520. The clone detector (e.g., clone detector 430) can then compare the MAC addresses retrieved for the CMs in a similar physical vicinity to the MAC addresses received from the CMTSs at stage 505 to determine which CMTS these CMs in the similar physical vicinity to the service address are registered. For the example DOCSIS-based system 400b of FIG. 4, the clone detector 430 can retrieve the MAC address for each of the neighboring CMs 420($j_1$), j=1, ..., $M_i$, which were identified at stage 520. The clone detector 430 then can compare these MAC addresses to the MAC addresses received from CMTS 410(i), i=1, ..., N at stage 505 and determine that the neighboring CMs 420($j_1$), j=1, ... $M_i$ identified at stage 520 are registered to CMTS 410(1).

At stage 530, the clone detector (e.g., clone detector 430) can identify the CM having the duplicated MAC address and registered to the CMTS identified at stage 525 as the authorized CM. For the example DOCSIS-based system 400b of FIG. 4, the clone detector 430 can consider CM 420($1_1$), which has the duplicated MAC address and registered to the same CMTS 420(1) as other CMs with service addresses in the same physical vicinity, as the authorized CM.

At stage 540, the clone detector (e.g., clone detector 430) can consider all the other CMs having the duplicated MAC address as cloned CMs. In other words, the clone detector 430 can consider all the other CMs having the duplicated MAC address and registered to any other CMTS than the CMTS identified at stage 525 as a cloned CM.

Once the cloned CMs have been identified, the MSO can decide to reduce or restrict the cloned CMs access to the network. For example, the MSO can add the cloned MAC address to a restricted list that resides at each of CMTS associated with the cloned CMs. The CMTS can instruct each of the cloned CMs to re-register and thereafter the cloned CM will not be allowed to register and access the network. As another example, the MSO can provide reduced service to the cloned CMs by reducing the bandwidth provided or could direct the cloned CMs to a walled garden. In some implementations, the cloned CM can be directed to reregister, upon which the CMTS does not affirmatively reject the re-registration but instead continues to instruct the CM re-register.

The present disclosure is not limited to DOCSIS systems and can be applied to other communication systems including wired or wireless systems. The communication system may include one or more access routers that provide one or more similar functions as a CMTS/CER and generally can serve as an intermediary to transfer traffic to and from a CPE device over a network.

Figure 6:
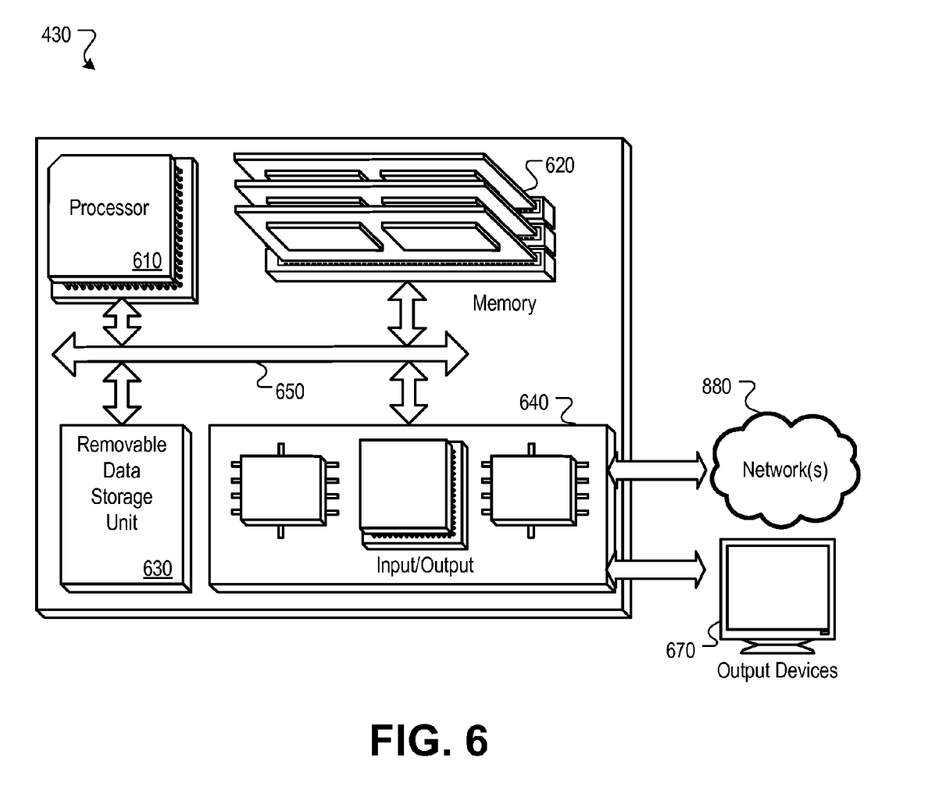
FIG. 6 is a block diagram illustrating an example broadband communications device operable to locate a cloned CM in a DOCSIS-based system.

FIG. 6 illustrates an example clone detector 430 operable to perform the example process 500 of FIG. 5. The clone detector 430 can include a processor 610, a memory 620, a removable data storage unit 630, and an input/output device 640. Each of the components 610, 620, 630, and 640 can, for example, be interconnected using a system bus 650. In some implementations, the clone detector 430 can include one of more interconnected boards where each board comprising components 610, 620, 630, and 640. The processor 610 is capable of processing instructions for execution within the clone detector 430. For example, the processor 610 can be capable of processing instructions for executing the process 500 of FIG. 5 in the clone detector 430. In some implementations, the processor 610 is a single-threaded processor. In other implementations, the processor 610 is a multi-threaded processor. The processor 610 is capable of processing instructions stored in the memory 620 or on the storage device 630.

The memory 620 stores information within the clone detector 430. In some implementations, the memory 620 is a computer-readable medium. In other implementations, the memory 620 is a volatile memory unit. In still other implementations, the memory 620 is a non-volatile memory unit.

In some implementations, the storage device 630 is capable of providing mass storage for the clone detector 430. In one implementation, the storage device 630 is a computer-readable medium. In various different implementations, the storage device 630 can, for example, include a hard disk device, an optical disk device, flash memory or some other large capacity storage device.

The input/output device 640 provides input/output operations for the clone detector 430. In one implementation, the input/output device 640 can include one or more of a wireless interface, HFC network interface, such as, for example, an IP network interface device, e.g., an Ethernet card, a cellular network interface, a serial communication device, e.g., and RS-232 port, and/or a wireless interface device, e.g., and 802.11 card. In another implementation, the input/output device 640 can include driver devices configured to receive input data and send output data to other input/output devices, as well as sending communications to, and receiving communications from various networks.

Implementations of the device of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

The processes and logic flows described in this specification can be performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, implementations of the subject matter described in this specification can be operable to interface with a computing device having a display, e.g., a CRT (cathode ray tube) or LCD (liquid crystal display) monitor, for displaying information to the user and a keyboard and a pointing device, e.g., a mouse or a trackball, by which the user can provide input to the computer.

While this specification contains many specific implementation details, these should not be construed as limitations on the scope of any invention or of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Particular implementations of the subject matter described in this specification have been described. Other implementations are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

The invention claimed is:

1. A method for locating cloned equipment in communication systems, the method comprising:
    receiving from each of a plurality of access routers in a communication system the media access control addresses of a plurality of customer premise equipment devices registered with the access router;
    comparing the media access control addresses received from the plurality of access routers to identify a cloned media access control address;
    retrieving a physical service address for the cloned media access control address;
    identifying a plurality of neighboring customer premise equipment devices having a physical service address within a predetermined distance of the service address for the cloned media access control address;
    identifying one or more access routers to which the plurality of neighboring customer premise equipment devices are registered; and
    identifying a customer premise equipment device having the cloned media access control address and registered to a different access router than the one or more access routers to which the plurality of neighboring customer premise equipment devices are registered as a cloned customer premise equipment device.

2. The method of claim 1 wherein the plurality of access routers in a communication system comprises a plurality of cable modem termination systems in a data over cable service interface specification based system.

3. The method of claim 2 wherein the plurality of customer premise equipment devices comprise a plurality of cable modems and wherein the plurality of neighboring customer premise equipment devices comprises a plurality of neighboring cable modems.

4. A non-transitory computer readable medium having instructions for causing a computer to execute a method for locating cloned equipment in communication systems, the method comprising:
    receiving from each of a plurality of access routers in a communication system the media access control addresses of a plurality of customer premise equipment devices registered with the access router;
    comparing the media access control addresses received from the plurality of access routers to identify a cloned media access control address;
    retrieving a physical service address for the cloned media access control address;
    identifying a plurality of neighboring customer premise equipment devices having a physical service address within a predetermined distance of the service address for the cloned media access control address;
    identifying one or more access routers to which the plurality of neighboring customer premise equipment devices are registered; and
    identifying a customer premise equipment device having the cloned media access control address and registered to a different access router than the one or more access routers to which the plurality of neighboring customer premise equipment devices are registered as a cloned customer premise equipment device.

5. The computer readable medium of claim 4 wherein the plurality of access routers in a communication system comprises a plurality of cable modem termination systems in a data over cable service interface specification based system.

6. The computer readable medium of claim 5 wherein the plurality of customer premise equipment devices comprises a plurality of cable modems and wherein the plurality of neighboring customer premise equipment devices comprises a plurality of neighboring cable modems.

7. A system for locating cloned equipment in communication systems, the system comprising:
    means for receiving from each of a plurality of access routers in a communication system the media access control addresses of a plurality of customer premise equipment devices registered with the access router;
    means for comparing the media access control addresses received from the plurality of access routers to identify a cloned media access control address;
    means for retrieving a physical service address for the cloned media access control address;
    means for identifying a plurality of neighboring customer premise equipment devices having a physical service address within a predetermined distance of the service address for the cloned media access control address;
    means for identifying one or more access routers to which the plurality of neighboring customer premise equipment devices are registered; and
    means for identifying a customer premise equipment device having the cloned media access control address and registered to a different access router than the one or more access routers to which the plurality of neighboring customer premise equipment devices are registered as a cloned customer premise equipment device.

* * * * *